(12) United States Patent
Falch et al.

(10) Patent No.: US 6,328,276 B1
(45) Date of Patent: Dec. 11, 2001

(54) MAGNETIC VALVE FOR A LIQUID-REGULATED HEATING AND/OR COOLING INSTALLATION

(75) Inventors: Peter Falch, deceased, late of Huegelsheim, by Jeanette Senn, legal representative; Juergen Hess, Baden-Baden; Johannes Pfetzer, Buehl; Christoph Heier, Iffezheim; Georg Reeb, Buehl-Eisental; Heinrich Fellmann, Buehlertal, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,564

(22) PCT Filed: Nov. 17, 1998

(86) PCT No.: PCT/DE98/03388

§ 371 Date: Oct. 19, 1999

§ 102(e) Date: Oct. 19, 1999

(87) PCT Pub. No.: WO99/29527

PCT Pub. Date: Jun. 17, 1999

(30) Foreign Application Priority Data

Dec. 6, 1997 (DE) ............................................. 197 54 257

(51) Int. Cl.$^7$ .............................. B60H 1/00; F16K 31/06; F16K 47/00
(52) U.S. Cl. ....................................... 251/54; 251/129.19
(58) Field of Search ................................. 251/50, 129.19, 251/54, 82, 83; 137/542, 543.15

(56) References Cited

U.S. PATENT DOCUMENTS

| | | | |
|---|---|---|---|
| 2,621,015 | * 12/1952 | MacGregor | 251/50 |
| 3,737,141 | * 6/1973 | Zeuner | 251/129.19 |
| 4,114,125 | * 9/1978 | Komatsu | 251/54 X |
| 4,364,541 | * 12/1982 | Chabat-Courrede et al. | 251/83 |
| 4,878,650 | * 11/1989 | Daly et al. | 251/50 |
| 4,932,434 | * 6/1990 | Taylor | 137/542 |
| 5,443,241 | 8/1995 | Odaira et al. . | |
| 5,791,630 | * 8/1998 | Nakao et al. | 251/129.19 |
| 5,810,330 | * 9/1998 | Eith et al. | 251/129.19 |

FOREIGN PATENT DOCUMENTS

| | | |
|---|---|---|
| 195 37 067 C1 | 8/1996 | (DE) . |
| 34 16 465 C2 | 9/1996 | (DE) . |
| 2 580 557 | 10/1986 | (FR) . |

* cited by examiner

Primary Examiner—Kevin Shaver
Assistant Examiner—Eric Keasel
(74) Attorney, Agent, or Firm—Michael J. Striker

(57) ABSTRACT

A magnetic valve for a fluid-controlled heating and/or cooling installations has a valve housing, an electromagnetically switched valve member which in a first fixing position makes a connection between an inlet conduit and an outlet conduit and in a second switching position blocks the connection, a valve shaft provided with an armature and connected movably to the valve member, the valve shaft having a side which faces the valve member and is provided with a unit for slowing down a speed of the valve shaft upon closure of the valve member, the valve housing and the valve member being arranged so that a flow direction of a fluid around the valve member is opposite to a closing direction of the valve member.

14 Claims, 2 Drawing Sheets

MAGNETIC VALVE FOR A LIQUID-REGULATED HEATING AND/OR COOLING INSTALLATION

BACKGROUND OF THE INVENTION

Figure 1:
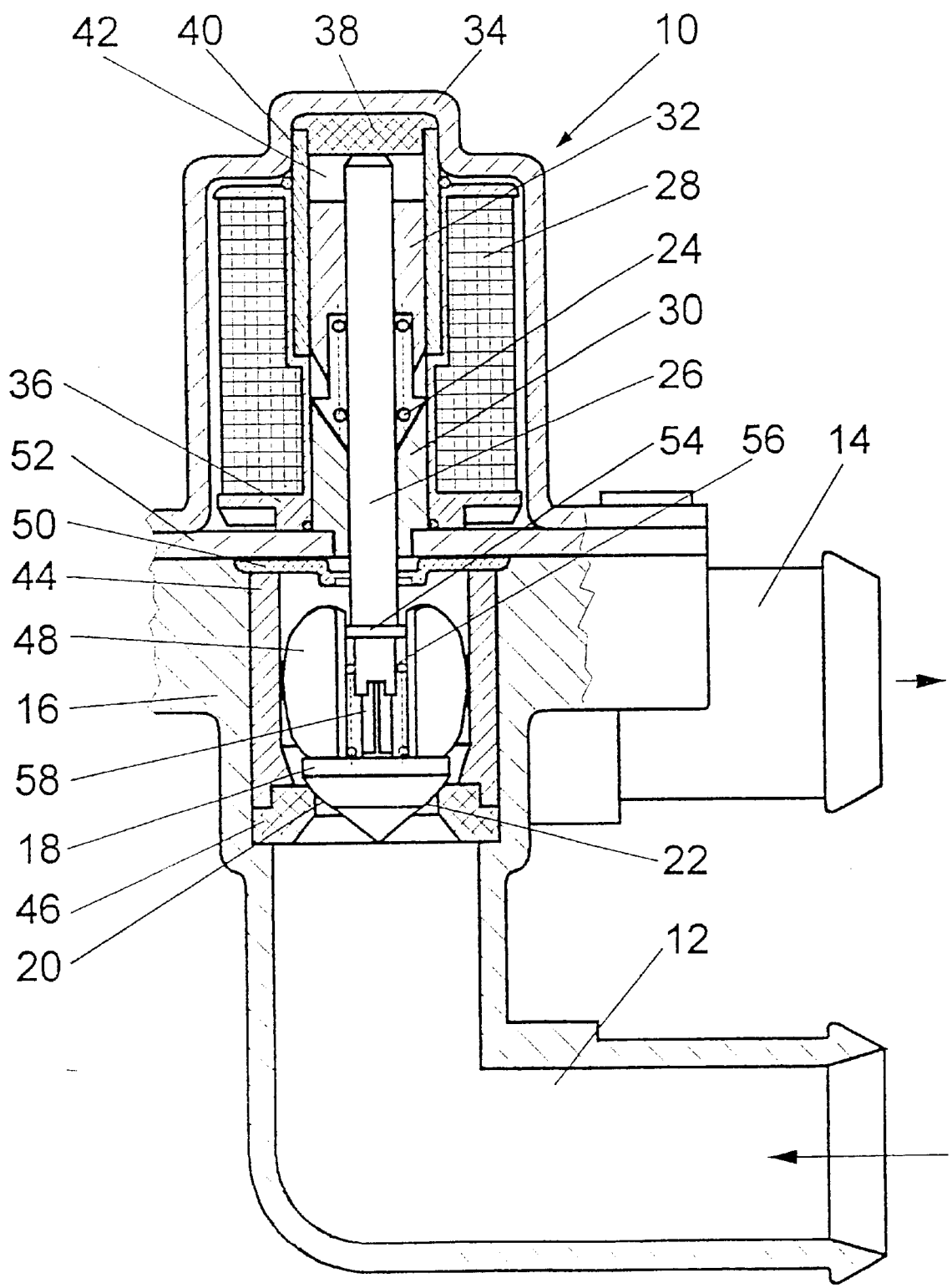

The invention is based on a magnetic valve for a fluid-controlled heating and/or cooling installation.

Such magnetic valves are used particularly in fluid-controlled heat exchangers for heating and/or air conditioning systems of motor vehicles. They can be triggered in clocked fashion as a function of the temperatures in the kg or in a passenger compartment, and the flow is determined substantially by the mean time cross section. By means of the fluid pressure and/or a valve spring, the valve member of the magnetic valve is opened, and it is closed by an excited coil of the magnetic valve by acting on an armature connected to the valve shaft. The chamber in which the armature is disposed is not hermetically sealed but instead is filled with fluid. This is intended to damp the motion of the armature hydraulically, in order to avert an abrupt closure and attendant pressure surges in the fluid system. This also prevents both noise and wear that occur when the valve member strikes the valve seat without damping. The damping action is severely impaired, however, by gas and particularly air bubbles that collect in the armature chamber, for instance when the system is filled. The magnetic valves can also be used as reversing valves, which short-circuit the coolant flow from the internal combustion engine in a first switching position and in a second switching position cause it to flow via a heat exchanger.

From German Patent DE 195 370 67 C1, in a magnetic valve disposed in a forward flow line of a heat exchanger of a heating system, it is known, by using the pressure drop between the forward flow line and the return line, to cause a flow through the armature chamber of the magnetic valve, in order to remove the air bubbles from the armature chamber and to avert the attendant disadvantages. To that end, a venting line is provided between the armature chamber and the return line, while by way of an annular gap between the armature and the coil of the magnetic valve, fluid from a forward flow line flows into the venting line and prevents air bubbles from collecting in the armature chamber.

From German Patent DE 34 164 65, in a magnetic valve, it is also known to connect an armature chamber to a line segment located on the side of the valve member toward the armature chamber by way of an axial conduit in an armature shaft. The pumping action of the armature during the valve actuation is intended to positively displace air from the armature chamber and to aspirate fluid. Because of the compressibility of the air, however, a sufficient exchange of fluid does not always take place between the armature chamber and the line segment, and under some circumstances the air can remain trapped in the upper, annular portion of the armature chamber.

The valve member is guided axially limitedly displaceably in the valve shaft. By means of the fluid pressure, it is pressed in the opening position against a stop on the valve shaft. If the coil of the magnetic valve is excited, then the armature secured to the valve shaft is attracted, and the valve shaft presses the valve member against a valve seat. If the valve member strikes the valve seat undamped, it causes noise because of the impulse of the impact and increases wear.

SUMMARY OF THE INVENTION

According to the invention, on the side of the valve shaft toward the valve member, means are provided that slow down the speed of the valve shaft upon closure of the valve member. These may be elastic elements, which are connected between the valve member and the valve shaft and which decouple the mass of the valve shaft and the armature from the mass of the valve member. As a result, the impulse of impact of the valve member and thus wear as well as the closing noise are greatly reduced.

As elastic elements, springs of suitable design may be used, such as helical springs, leaf springs, cup springs, and springs of rubber, plastic, etc. They are simple, functionally reliable, and require no maintenance.

The valve member is guided axially limitedly displaceably relative to the valve shaft, in accordance with the spring travel. By means of the elastic element, the kinetic energy of the valve shaft and of the armature is stored and is then dissipated by the intrinsic damping behavior of the magnetic valve.

The valve member is pressed firmly against the valve seat by the valve shaft in the closing position, so that the closing function is assured, while in the opening position the valve member is lifted from the valve seat by the valve spring. However, the elastic element can also be designed as strong enough that the valve member is pressed securely against the valve seat by the elastic element in the closing position. In another variant, the elastic element can be designed so that the closing member is moved by the fluid pressure into the opening position and is pressed against the valve seat only when the magnet coil is excited. A further variant provides that the elastic element does not come into action until after a predetermined travel of the valve member and thus is opened by the fluid flow when the magnet coil is not excited, but is pressed against the valve seat by the elastic element as soon as the magnet coil is excited.

The speed of the valve shaft can also be reduced by a damping device that engages the valve shaft or the valve member. This damping device not only prevents the valve member or valve shaft from continuing to vibrate after the seating of the valve member but also already brakes the speed of the armature, valve shaft and valve member during the valve motion.

Since the means for slowing down the valve shaft are disposed on the side toward the valve member, the damping action in the armature chamber and the flow through the armature chamber can be largely dispensed with. If coolant does not flow through the armature chamber, then there is no risk of depositing abraded material and dust in the armature chamber and on the armature and the electromagnet, which would impair both the magnetic and the mechanical properties of the magnetic valve.

The damping device is formed in a simple way by a disk secured to the valve shaft that is moved in a fluid-filled part of the valve housing. In some cases, it may suffice for the damping disk to be disposed in a flow conduit, but the action can be improved if it is guided with a slight play from a separate damping chamber that is sealed off from the outlet conduit by a diaphragm seal. Upon the motion of the damping disk, fluid is positively displaced from one side of the damping disk to the other via an annular gap. The damping performance can be adapted by means of additional throttle bores in the damping disk.

In order not to substantially increase the masses in motion of the magnetic valve by means of the mass of the damping disk, it is expedient for the disk to be thin and made from a lightweight material, such as lightweight metal or plastic. These materials furthermore have no effect on the magnetic performance of the magnetic valve.

In order to assure that the damping chamber is always filled with fluid, in a feature of the invention fluid can be exchanged between the damping chamber and the outlet conduit via a throttle restriction.

BRIEF DESCRIPTION OF THE INVENTION

In the drawing, exemplary embodiments of the invention are shown. Numerous characteristics are shown and describe in conjunction with each other in the description and the claims.

One skilled in the art will also expediently consider the characteristics individually and combine them into appropriate combinations.

Figure 2:
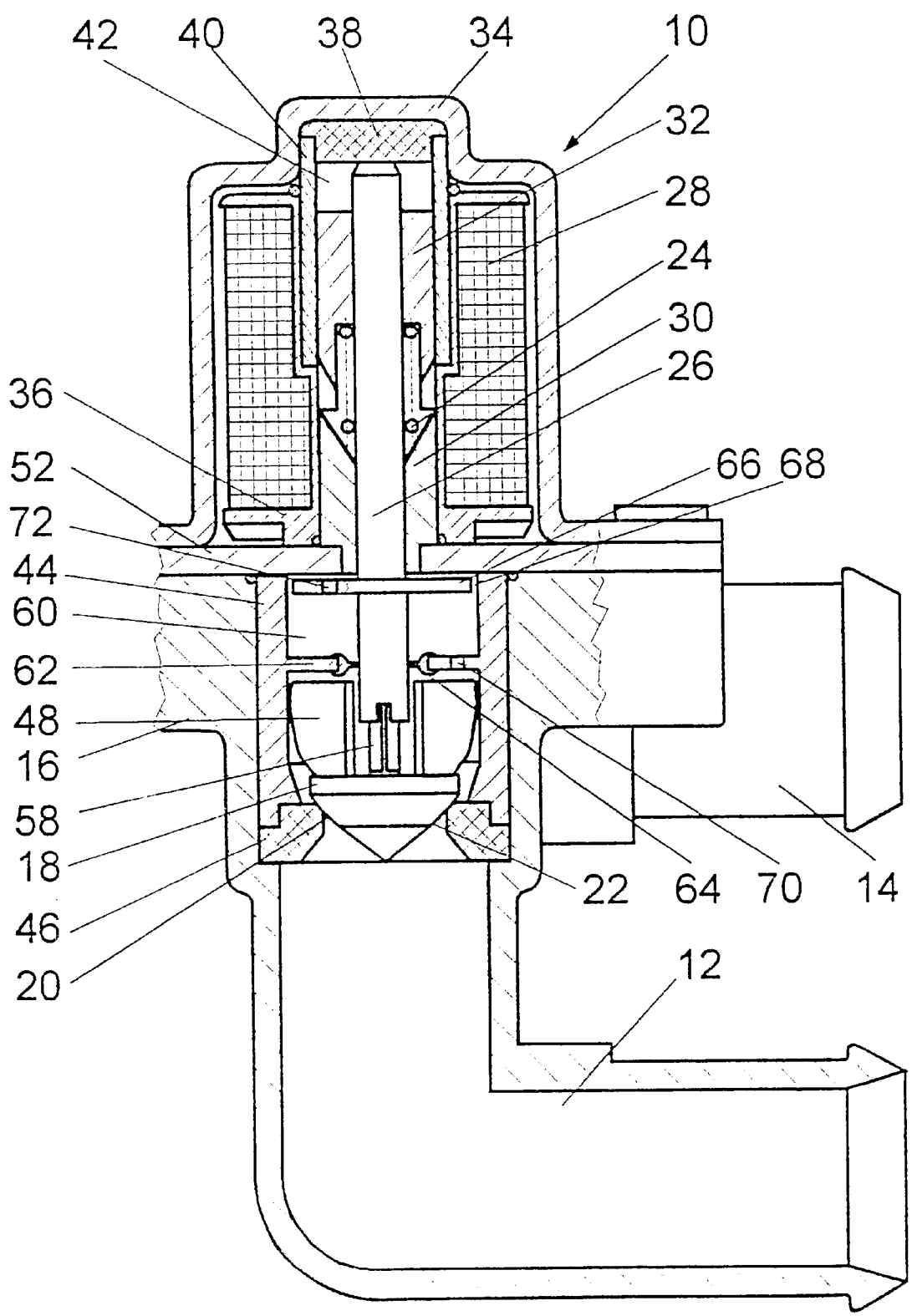

Shown are:

FIG. 1, a cross section through a magnetic valve of the invention in the pressureless position of repose;

FIG. 2, a variant with a damping disk.

DESCRIPTION OF THE PREFERRED EMBODIMENTS

The fm 10 is as a rule disposed between an internal combustion engine and a heat exchanger of a heating system. It has an inlet conduit 12, which is connected to the engine, and an outlet conduit 14, which is connected to the heat exchanger of the heating system. A valve member 18 is provided between the conduits 12, 14; it cooperates via a valve cone 20 with a valve seat 22 and in a first switching position makes the connection between the inlet conduit 12 and the outlet conduit 14 and blocks it in a second switching position.

The valve member 18 is guided limitedly axially displaceably and a valve shaft 26 by means of a guide peg 58 (FIG. 1). Secured to the valve shaft 26 is an armature 32, which cooperates with a magnet coil 28 and is guided axially displaceably in an armature chamber 42 by a guide bush 40. A stop 38, on which the valve shaft 26 rests in the opened position of the magnetic valve 10 under the force of a valve spring 24, closes the guide bush 40 and thus the armature chamber 42 on the face end. The stop 38 is expediently made of a damping plastic material.

The fluid pressure in the inlet conduit 12 displaces the valve member 18 into an opened position, as long as the magnet coil 28 is not excited. When the magnet coil 28 is excited, a magnet core 30, which is connected to a magnetic return yoke 36, attracts the armature 32 counter to the force of the valve spring 24 and the fluid pressure in the inlet conduit 12, and the valve member 18 closes the connection between the inlet conduit 12 and the outlet conduit 14. Motion gaps for the free motion of the armature 32 and the valve shaft 26 are provided between the armature 32 and the guide bush 40 and between the valve shaft 26 and the magnet core 30.

An elastic element in the form of a helical spring 56 surrounds the guide peg 58 and the valve shaft 26 and comes into contact with a collar 54 of the valve shaft and thus comes into action after a predetermined travel of the valve member. Thus the valve member 18 acts as a check valve when the magnet coil is not excited. The spring 56 here can be designed for the optimal spring stiffness for the mass forces involved. When the magnet coil 28 is excited, the valve member 18 is pressed against the valve seat 22, either via the spring 56 or directly by the valve shaft 26.

It is also possible for the spring 56 already to be braced on the collar 54 when the magnet coil is not excited. In that case, the valve member 18 acts as a pressure valve, which opens as soon as the fluid pressure in the inlet conduit 12 on the valve member 18 exceeds the force of the spring 56.

Instead of the helical spring 56 shown, other types of spring, such as leaf springs, cup springs or elastic elements of rubber or plastic may be used. The elastic elements are designed such that on the one hand they do not impair the closing function of the valve member 18, and on the other they allow adequate decoupling between the valve member 18 and the valve shaft 26.

The magnet coil 28 is located in a magnet cup 34, which is secured to a valve housing 16 via a mounting plate 52. A valve seat housing 44 with a valve seat ring 46 is inserted into the valve housing 16. The valve seat housing 44 has a connecting conduit 48 to the outlet conduit 14. A diaphragm seal 50 is disposed between the valve seat housing 44 and the mounting plate 52; it sealingly surrounds the valve shaft 26 and seals off the valve seat housing 44 from the magnet cup 34 (FIG. 1).

In the version of FIG. 2, a damping disk 66 is solidly disposed on the valve shaft 26 and moves within a fluid-filled damping chamber 60. During the closing motion, fluid is fed via an annular gap 68 from the side of the damping disk 66 toward the valve member 18 to the opposite side, and upon opening of the valve it is fed in the opposite direction. To adapt the damping action, throttle bores 72 are provided in the damping disk 66.

The damping chamber 60 is defined toward the valve member 18 by a wall 62, which has a diaphragm seal 64 toward the valve shaft 26. To assure that the damping chamber 60 will always be filled with fluid, throttle restrictions 70 are provided between the damping chamber 70 and a connecting conduit 48.

The elastic elements of FIG. 1 and the damping device of FIG. 2 may be employed individually or in combination.

What is claimed is:

1. A magnetic valve for a fluid-controlled heating and/or cooling installations, comprising a valve housing having at least one inlet conduit and at least one outlet conduit; an electromagnetically switched valve member which in a first fixing position makes a connection between said inlet conduit and said outlet conduit and in a second switching position blocks said connection; a valve shaft provided with an armature and connected movably to said valve member, said valve shaft having a side which faces said valve member and is provided with means for slowing down a speed of said valve shaft upon closure of said valve member, said valve housing and said valve member being arranged so that a flow direction of a fluid around said valve member is opposite to a closing direction of said valve member, said valve member and said valve shaft being uncoupled from one another, and said slowing down means including an elastic element connected between said valve member and said valve shaft to allow a relative movement between said valve member and said valve shaft.

2. A magnetic valve as defined in claim 1, wherein said valve member is guided in said valve shaft by a guide peg so that said valve member is axially displaceable over a limited range, said elastic element surrounding said guide peg.

3. A magnetic valve as defined in claim 1, wherein said valve member is guided in said valve shaft by a guide peg so that said valve member is axially displaceable over a limited range, said elastic element surrounding said valve shaft.

4. A magnetic valve as defined in claim 1, wherein said elastic element is spring.

5. A magnetic valve as defined in claim 1, wherein said elastic element is arranged so that said elastic element does not come into action until after a predetermined travel of said valve member.

6. A magnetic valve as defined in claim 1, wherein said slowing down means include a damping device.

7. A magnetic valve as defined in claim 6, wherein said valve shaft is provided with said damping device.

8. A magnetic valve as defined in claim 6, wherein said valve member is provided with said damping device.

9. A magnetic valve as defined in claim 6, wherein said damping device is a damping disk which is secured to a member selected from the group consisting of said valve shaft and said valve member, said damping disk being guided relative to said valve housing with a distance therebetween.

10. A magnetic valve as defined in claim 9, wherein said damping disk is composed of light weight metal.

11. A magnetic valve as defined in claim 9, wherein said damping disk is composed of plastic.

12. A magnetic valve as defined in claim 11, wherein said valve housing has a separate damping chamber in which said damping disk is accommodated.

13. A magnetic valve as defined in claim 12, and further comprising a diaphragm seal which seals off said damping chamber from said outlet conduit.

14. A magnetic valve as defined in claim 12, and further comprising a throttle restriction through which said damping chamber communicates with said outlet conduit.

* * * * *